Sept. 18, 1951     B. H. CHRISTOPHER, JR     2,568,220
DUAL MASTER CYLINDER FOR HYDRAULIC AUTOMOBILE BRAKES
Filed July 13, 1946
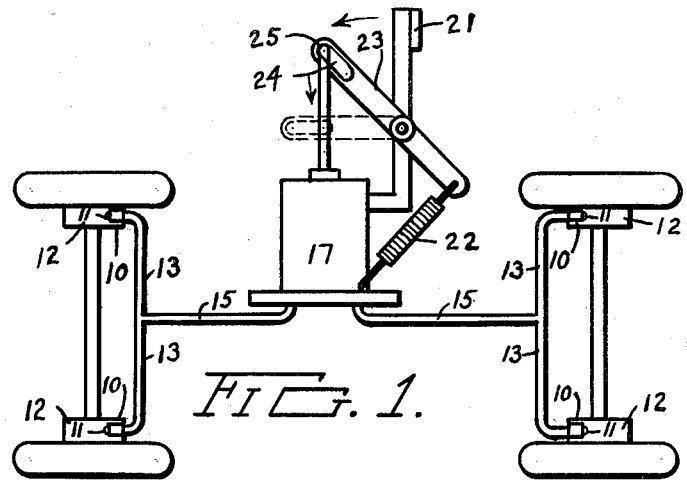
FIG. 1.
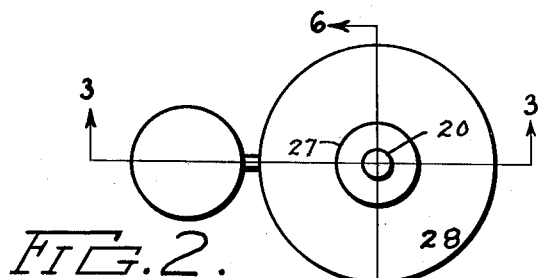
FIG. 2.
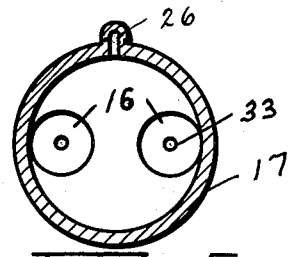
FIG. 5.
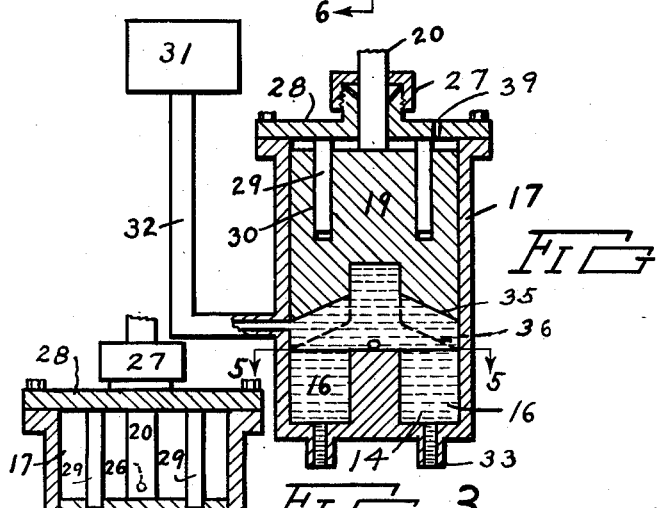
FIG. 6.
FIG. 3.
FIG. 4.
Inventor
BENJAMIN H. CHRISTOPHER, JR.
By Howard J. Whelan.
Attorney
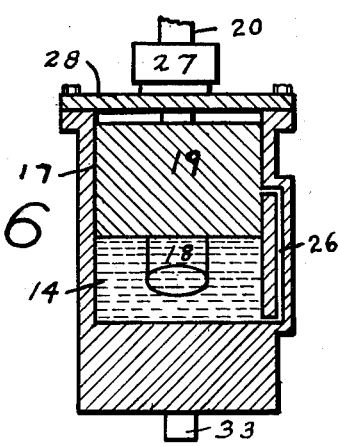

Patented Sept. 18, 1951

2,568,220

UNITED STATES PATENT OFFICE 2,568,220

DUAL MASTER CYLINDER FOR HYDRAULIC AUTOMOBILE BRAKES

Benjamin H. Christopher, Jr., Baltimore, Md.

Application July 13, 1946, Serial No. 683,488

2 Claims. (Cl. 60—54.6)

This invention relates to vehicle controls and more particularly to a fluid braking mechanism that actuates several brakes simultaneously.

In a particular form of brake operating mechanism using a liquid as the medium for transmitting power from the foot pedal on an automobile to the individual cylinders of each brake, leakage at any point in the braking sytem will cause a disruption of operation in all the brakes because the fluid has access to all parts of the system.

In other words the driver of the automobile is apt to find all the brakes out of commisison at one time, without any warning. This situation is disastrous but nevertheless exists in the conventional braking systems used.

It is an object of the present invention to provide a new and improved braking mechanism for operating hydraulic brakes that will avoid one or more of the disadvantages and limitations of the prior art.

Another object of the invention herein described is to provide a new and improved hydraulic brake operating mechanism that will not become totally inoperative when breakage of the lines carrying the transmission fluid occurs in a part of the system.

An additional object of this invention is to provide a new and improved hydraulic brake operating mechanism that will permit adjustments to be made for any set of the brakes without affecting the others in the same system.

Other objects will become apparent as the invention is more fully set forth.

In order to provide a clearer understanding of the invention, reference is made to the appended drawing and the following description, which when taken together outline a particular form, by way of example, to illustrate the principles under which the invention functions, while the scope and spirit of the invention is particularly pointed out in the claims.

In the drawing:

Figure 1 is a diagrammatic view of a braking system embodying this invention;

Figure 2 is a plan view of the hydraulic braking unit;

Figure 3 is a sectional view taken through the hydraulic braking unit along line 3—3 of Figure 2, showing the large and auxiliary pistons in their normal upward position, the dotted lines showing the auxiliary pistons in their lower regular operated position when the brakes are fully applied;

Figure 4 is a sectional view taken on line 3—3 of Figure 2, similar to that shown in Figure 3, except the large and auxiliary pistons are shown in the position they will assume when one of the oil lines are broken;

Figure 5 is a sectional view taken along line 5—5 of Figure 3, and

Figure 6 is a sectional view taken along line 6—6 of Figure 2, showing the large and auxiliary pistons in upward normal position and their relationship to the compression release line.

Similar reference characters refer to similar parts throughout the drawing.

In the construction portrayed, two auxiliary cylinders and pistons are shown in the drawing. The number may be varied to suit. The numeral 10 represents the conventional wheel cylinders the pistons of which actuate the brakes 11 on the drums 12 of an automobile. These cylinders 10 are supplied with pressure fluid 14 through individual tubing 13. Each individual tubing is connected through a feed line 15 to its own cylinder 16, which is constructed as a subsidiary chamber to a master cylinder 17.

The two cylinders 16, shown in the drawing are receiving elements for two piston like projections 18 on the lower face of a master piston 19 reciprocating in the master cylinder 17. The pistons 18—18 enter the cylinders 16—16 when one of the tubes connected to the brake mechanism becomes broken. The master piston 19 through its rod 20 is operated up and down by a pedal mechanism 21 which is forced outward by a spring 22 on the cylinder 17 and actuated by the user. The pedal mechanism is attached to an arm 23 having an elongated slot 24 in which a pin 25 connected to rod 20 slides to move the piston 19 when the pedal 21 is moved. A relief passage 26 is located in the wall of the cylinder 17 with outlets connecting each end of the passage to the bore of the cylinder 17 to prevent an air or oil lock forming within the braking system. The lower end of the passage 26 allows any oil trapped on the raised portion between the cylinders 16 and the medial portion cut out from the under face of piston 19 to escape. This passage is arranged to carry off excess oil and air bubbles that may interfere with the proper operation of the braking system. A packing gland 27 and vent 39 are installed in the cover 28 of the cylinder 17. Gland 27 serves to take up wear between cover 28 and rod 20 while vent 39 permits exhaust of any air or trapped oil above the top side of piston 19. The cover 28 is equipped with pins 29 which slide in holes 30 to align piston 19. A tank 31 and line 32 are attached to the wall of cylinder 17 for filling it with hydraulic fluid.

The master piston 19 pressurizes the hydraulic fluid and forces it out into the tubes 13 and 15 to actuate the brake mechanism under normal operation. If one of the tubes is broken, so that its fluid leaks out, it will eliminate the action of its particular brake. Such situation does not affect the other cylinder 16 and its specific segregated tubings 13 and 15 and the brakes connected thereto, since they are not connected together. It is however advantageous to dispose the cylinders in a vertical position, and to keep the projecting pistons 18 and their angular faces 35, above the cylinders 16 even at the end of their normal strokes as shown in Figure 3 by dotted lines 36 thus allowing sufficient leaway for the normal expansive variations in the fluid. The outer portion of angular faces 35 scrapes along the face of the large cylinder 17 forcing the excess oil in the smaller cylinders 16 and causing oil to rise through passage 26 when the piston 19 approaches the bottom its stroke. It will be noted that when the angular faces have passed the inner cylinder projection between the cylinders 16, it is still possible to exhaust air bubbles and entrapped oil through the passage 26, thus allowing for normal expansive volumetric variations in the fluid, as stated above. This action would not be possible if the cooperating faces of the piston and cylinder were straight. Furthermore, in the event of a leak in one of the lines connected with either cylinder 16, leakage from the other line is impossible as soon as one of the angular faces 35 has reached the position indicated at 36 in Figure 3. If the cooperating faces of the piston 19 and the cylinder 17 were straight, the broken or leaky line would vent the unbroken line. The automatic adjustment of the brakes is provided for by introducing more or less hydraulic fluid in each particular cylinder 16 to suit its requirements and thus balance the brake tension equally all around. The coil spring 22 serves to bring the pistons back to their normal raised position when the operating pressure on the brake pedal is reduced by the operator. In the event an oil tubing 13 or 15 should leak or break, the remaining brakes would be applied through the action of one of the pistons 18 operating in its respective cylinder 16 as shown in Figure 4 to build up its pressure. The angular faces 35 allow the air which has entered cylinder 17 through the broken line to escape from cylinder 16 into cylinder 17 so pressure can be applied to a good set of brakes.

The cylinder unit is preferably cast or formed into an integral arrangement, so that it becomes a compact and effective mechanism, readily accessible for inspection and repairs. This unit arrangement keeps the pistons effectively aligned, and reinforces the cylinders against the jolts and vibrations incurred in the vehicle's use. The feed lines 15 ore attached to the tubes 13, and the master cylinder 17 is closed by a head 28 bolted into place, with the brake mechanism connected through it to the piston 18. This head 28 when removed permits access to the interior of the cylinders.

While but one general form of the invention is shown in the drawing and described in the specification, it is not desired to limit this application for patent to this particular form, as it is appreciated that other forms of construction could be made that would use the same principles and come within the scope of the appended claims.

Having thus described the invention, what is claimed is:

1. A device of the character set forth comprising a master cylinder, a master piston operating in said cylinder, operating means connected to said piston, subcylinders formed integrally and in direct communication with said master cylinder and each connected to a brake operating mechanism, subpistons operating in the subcylinders, said subpistons forming integral and spaced-apart extensions of said master piston and said subcylinders having a common separating wall coextensive and cooperating with the space between the subpistons, and passage means in the peripheral wall of said master cylinder controlled by said master piston and subpistons for venting the space between the subpistons when said master piston and subpistons are nearing the end of their lower stroke.

2. A device of the character set forth in claim 1 wherein the venting passage means include a channel in the wall of said master cylinder having an upper port opening controlled by the master piston and a lower port opening controlled by the subpistons, and an opening in the master cylinder to place the channel in communication with the atmosphere when the master piston and subpistons are nearing the end of their lower stroke as aforesaid.

BENJAMIN H. CHRISTOPHER, JR.

REFERENCES CITED

The following references are of record in the file of this patent:

UNITED STATES PATENTS

| Number | Name | Date |
| --- | --- | --- |
| 1,932,916 | Taylor | Oct. 31, 1933 |
| 2,021,463 | Peters | Nov. 19, 1935 |
| 2,124,363 | Bertrand | July 19, 1938 |
| 2,526,720 | Bacca | Oct. 24, 1950 |